United States Patent
Uhr et al.

(10) Patent No.: US 11,017,122 B2
(45) Date of Patent: *May 25, 2021

(54) METHOD AND SERVER FOR AUTHENTICATING AND VERIFYING FILE

(71) Applicant: Coinplug, Inc., Gyeonggi-do (KR)

(72) Inventors: Joon Sun Uhr, Gyeonggi-do (KR); Jay Wu Hong, Seoul (KR); Joo Han Song, Gyeonggi-do (KR)

(73) Assignee: Coinplug, Inc., Gyeonggi-do (KR)

( * ) Notice: Subject to any disclaimer, the term of this patent is extended or adjusted under 35 U.S.C. 154(b) by 65 days.

This patent is subject to a terminal disclaimer.

(21) Appl. No.: 16/506,220

(22) Filed: Jul. 9, 2019

(65) Prior Publication Data
US 2019/0332809 A1    Oct. 31, 2019

Related U.S. Application Data

(63) Continuation of application No. 16/018,195, filed on Jun. 26, 2018, now Pat. No. 10,395,062, which is a (Continued)

(30) Foreign Application Priority Data

Dec. 29, 2015    (KR) .................. 10-2015-0188978

(51) Int. Cl.
*G06F 21/64*    (2013.01)
*G06F 16/13*    (2019.01)
(Continued)

(52) U.S. Cl.
CPC ............ *G06F 21/64* (2013.01); *G06F 16/137* (2019.01); *G06F 21/602* (2013.01); *G06F 21/62* (2013.01);
(Continued)

(58) Field of Classification Search
CPC .... G06F 21/64; G06F 17/30097; G06F 21/62; G06F 21/602; G06F 2221/2107;
(Continued)

(56) References Cited

U.S. PATENT DOCUMENTS 6,601,172 B1 *    7/2003  Epstein ............. G06Q 20/3821
                                                          380/28
2007/0174206 A1    7/2007  Colella
(Continued)

FOREIGN PATENT DOCUMENTS

EP         0963637 A2 * 12/1999 ......... G06Q 20/3821
KR    1019990025296 A     4/1999
(Continued)

OTHER PUBLICATIONS

Internet News (Zdnet Korea), Various Electronic Documents, Authentication by BlockChain, Nov. 17, 2015 http://wwwzdnet.co.kr/news/news_view.asp?artice_id=20151116185432.

*Primary Examiner* — Harunur Rashid
(74) *Attorney, Agent, or Firm* — Husch Blackwell LLP

(57) ABSTRACT

Provided is a method according to one embodiment of the present invention comprising the steps of: (a) a server generating, by means of a hash function, a message digest (MD) of a particular file when a request for authenticating same is obtained; (b) when an MD encoded with a private key of a particular user is obtained, and if (A) information for the MD, which was encoded with the private key of the particular user, decoded with a public key of the particular user matches (B) the MD generated in step (a), then the server registering, in a database, a hash value of the MD encoded with the private key of the particular user and a private key of the server; and (c) the server obtaining a transaction ID.

8 Claims, 6 Drawing Sheets

Related U.S. Application Data continuation of application No. PCT/KR2016/013958, filed on Nov. 30, 2016.

(51) Int. Cl.
| | |
|---|---|
| *G06F 21/62* | (2013.01) |
| *G06Q 20/02* | (2012.01) |
| *G06Q 20/38* | (2012.01) |
| *H04L 9/06* | (2006.01) |
| *H04L 9/30* | (2006.01) |
| *G06Q 50/18* | (2012.01) |
| *G06Q 20/22* | (2012.01) |
| *G06F 21/60* | (2013.01) |
| *H04L 29/06* | (2006.01) |

(52) U.S. Cl.
CPC ........... *G06Q 20/02* (2013.01); *G06Q 20/223* (2013.01); *G06Q 20/38* (2013.01); *G06Q 50/18* (2013.01); *H04L 9/06* (2013.01); *H04L 9/0643* (2013.01); *H04L 9/30* (2013.01); *H04L 63/123* (2013.01); *G06F 2221/2107* (2013.01)

(58) Field of Classification Search
CPC ....... G06F 16/137; H04L 63/123; H04L 9/06; H04L 9/30; H04L 9/0643; G06Q 50/18; G06Q 20/02; G06Q 20/223; G06Q 20/38

See application file for complete search history.

(56) References Cited

U.S. PATENT DOCUMENTS

| | | | |
|---|---|---|---|
| 2011/0231645 A1 | 9/2011 | Thomas et al. | |
| 2014/0108223 A1* | 4/2014 | Xiao | G06Q 10/10 |
| | | | 705/37 |

FOREIGN PATENT DOCUMENTS

| | | | | |
|---|---|---|---|---|
| KR | 1019990033432 A | 5/1999 | | |
| KR | 1019970054789 | 3/2000 | | |
| KR | 1020010106364 A | 11/2001 | | |
| KR | 1020020093680 | 12/2002 | | |
| KR | 100646948 B1 | 11/2006 | | |
| WO | WO-2013105941 A1 * | 7/2013 | ............ | G06Q 40/02 |

* cited by examiner

METHOD AND SERVER FOR AUTHENTICATING AND VERIFYING FILE

CROSS REFERENCE TO RELATED APPLICATIONS

This application is a continuation of U.S. patent application Ser. No. 16/018,195 filed Jun. 26, 2018, which is a continuation of International Patent Application No. PCT/KR2016/013958 filed Nov. 30, 2016, and which claims the benefit of Korean Patent Application No. 10-2015-0188978 filed Dec. 29, 2015. The entire disclosures of the above applications are incorporated herein by reference.

FIELD OF THE INVENTION

The present invention relates to a method for authenticating and verifying a file; and more particularly, to the method for authenticating and verifying the file by an "authentication process" of, if an authentication request for the file is acquired, (i) generating or supporting another device to generate a specific message digest of the file using a hash function, (ii) if a first message digest calculated by encoding the specific message digest with a private key of a user is acquired, and if reference information acquired by decoding the first message digest with a public key of the user corresponds to the specific message digest, registering or supporting another device to register a hash value of a second message digest, generated by encoding the specific message digest with the private key of the user and a private key of a server, in a database, and (iii) acquiring or supporting another device to acquire a transaction ID indicating a location of the hash value registered in the database, and by a "verification process" of, if a verification request for a second file is acquired, (i) acquiring or supporting another device to acquire the transaction ID corresponding to at least one of the public key of the user and an original message digest of the second file generated by using the hash function, (ii) acquiring or supporting another device to acquire an OP message, including the hash value of the second message digest generated by encoding the specific message digest with the private key of the user and the private key of the server, from the database by referring to the transaction ID, and (iii) determining or supporting another device to determine the second file as verified, if the hash value of the second message digest in the OP message corresponds to a hash value of a third message digest generated by encoding the original message digest with the private key of the server and the private key of the user, and the server using the same.

BACKGROUND OF THE INVENTION

An authentication is an act of publicly certifying the existence or the contents of a specific fact or specific legal relations. When commissioned to authenticate the specific legal relations, an authentication officer generally writes, signs and seals, and stores a document in an authentication office.

However, there are constraints of time and space, and a possibility of missing, forging, and falsifying an authenticated document because, in a conventional authentication, a client physically visits the authentication office with a document to be authenticated and its certificate is stored in the authentication office.

Herein, the inventor of the present invention developed an authentication system for a file to perform the authentication in real-time without the possibility of forgery and falsification and without constraints of space by recording authentication information in a blockchain of virtual currency.

SUMMARY OF THE INVENTION

It is an object of the present invention to solve all the aforementioned problems.

It is another object of the present invention to provide an authentication system for a file to perform an authentication and a verification in real-time without a possibility of forgery and falsification and without constraints of space by recording authentication information in a blockchain of virtual currency.

It is still another object of the present invention to provide the authentication system for the file with guaranteed security to perform the authentication and the verification in real-time without the possibility of forgery or falsification and without the constraints of space by using a hash function and an encryption technology.

In accordance with one aspect of the present invention, there is provided a method for authenticating a file, including steps of: (a) a server, if an authentication request for the file is acquired, generating or supporting another device to generate a specific message digest of the file using a hash function; (b) the server, if a first message digest generated by encoding the specific message digest with a private key of a user is acquired, and if reference information acquired by decoding the first message digest with a public key of the user corresponds to the specific message digest generated at the step of (a), registering or supporting another device to register a hash value of a second message digest, generated by encoding the specific message digest with the private key of the user and a private key of the server, in a database; and (c) the server acquiring or supporting another device to acquire a transaction ID indicating a location of the hash value registered in the database.

In accordance with another aspect of the present invention, there is provided a method for verifying a file, including steps of: (a) a server, on condition that the server has determined a user as related to a first file, as a reference file, in response to an authentication request for the first file and, as a result, that the server has stored a first hash value of a first message digest, generated by encoding a message digest of the first file with a private key of the user and a private key of the server, in a database, and that the server has been managing its corresponding transaction ID, if a verification request for a second file is acquired, acquiring or supporting another device to acquire the transaction ID corresponding to at least one of a public key of the user and an original message digest of the second file generated by using a hash function; (b) the server acquiring or supporting another device to acquire an OP message, including the first hash value of the first message digest, from the database by referring to the transaction ID; and (c) the server determining or supporting another device to determine the second file as verified, if the first hash value in the OP message corresponds to a second hash value of a second message digest generated by encoding the original message digest with the private key of the server and the private key of the user.

In accordance with still another aspect of the present invention, there is provided a server for authenticating a file, including: a communication part for acquiring or supporting another device to acquire an authentication request for the file; and a processor for, (I) if the authentication request for the file is acquired, generating or supporting another device to generate a specific message digest of the file using a hash function, and if a first message digest generated by encoding the specific message digest with a private key of a user is acquired, and if reference information acquired by decoding the first message digest with a public key of the user corresponds to the generated specific message digest, registering or supporting another device to register a hash value of a second message digest, generated by encoding the specific message digest with the private key of the user and a private key of the server, in a database; and (II) acquiring or supporting another device to acquire a transaction ID indicating a location of the hash value registered in the database.

In accordance with still yet another aspect of the present invention, there is provided a server for verifying a file, including: a communication part for acquiring a verification request for a second file; and a processor for, (I) on condition that the server has determined a user as related to a first file, as a reference file, in response to an authentication request for the first file and, as a result, that the server has stored a first hash value of a first message digest, generated by encoding a message digest of the first file with a private key of the user and a private key of the server, in a database, and that the server has been managing its corresponding transaction ID, if the verification request for the second file is acquired, acquiring or supporting another device to acquire the transaction ID corresponding to at least one of a public key of the user and an original message digest of the second file generated by using a hash function; (II) acquiring or supporting another device to acquire an OP message, including the first hash value of the first message digest, from the database by referring to the transaction ID; and (III) determining or supporting another device to determine the second file as verified, if the first hash value in the OP message corresponds to a second hash value of a second message digest generated by encoding the original message digest with the private key of the server and the private key of the user.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art.

DETAILED DESCRIPTION OF THE PREFERRED EMBODIMENTS

Figure 1:
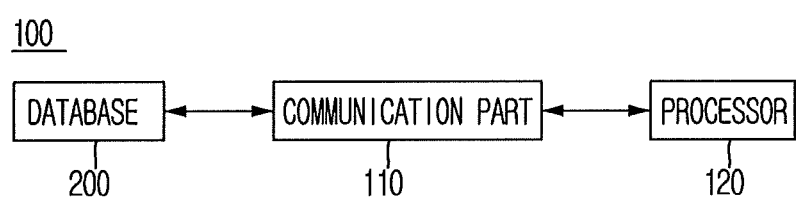
FIG. 1 is a block diagram illustrating a configuration of a server that performs an authentication of a file in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating a configuration of a server that performs an authentication of a file in accordance with one example embodiment of the present invention.

FIGS. 2 to 6 are sequence diagrams illustrating processes for performing the authentication and a verification of the file in accordance with various example embodiments of the present invention.

Before explaining the example embodiments, expressions used in the present specification are defined as follows. On the left of ':' is the expression and on the right is a definition of the expression.

Definitions of Expressions

PrivX: Private key of X
PubX: Public key of X
AESX: AES secret key of X
$Enc_{PrivX}(Y)$: Output of encryption of Y using PrivX
$Dec_{PubX}(Y)$: Output of decryption of Y using PubX
$Enc_{AESX}(Y)$: Output of AES encryption of Y using AESX
$Dec_{AESX}(Y)$: Output of AES decryption of Y using AESX
Hash(Y): Hash value of Y First of all, a process for authenticating the file in response to a request from a single user is explained by referring to FIGS. 1 and 2.

By referring to FIG. 1, a server 100 that performs the authentication of the file in accordance with one example embodiment of the present invention may include a communication part 110 and a processor 120.

Figure 2:
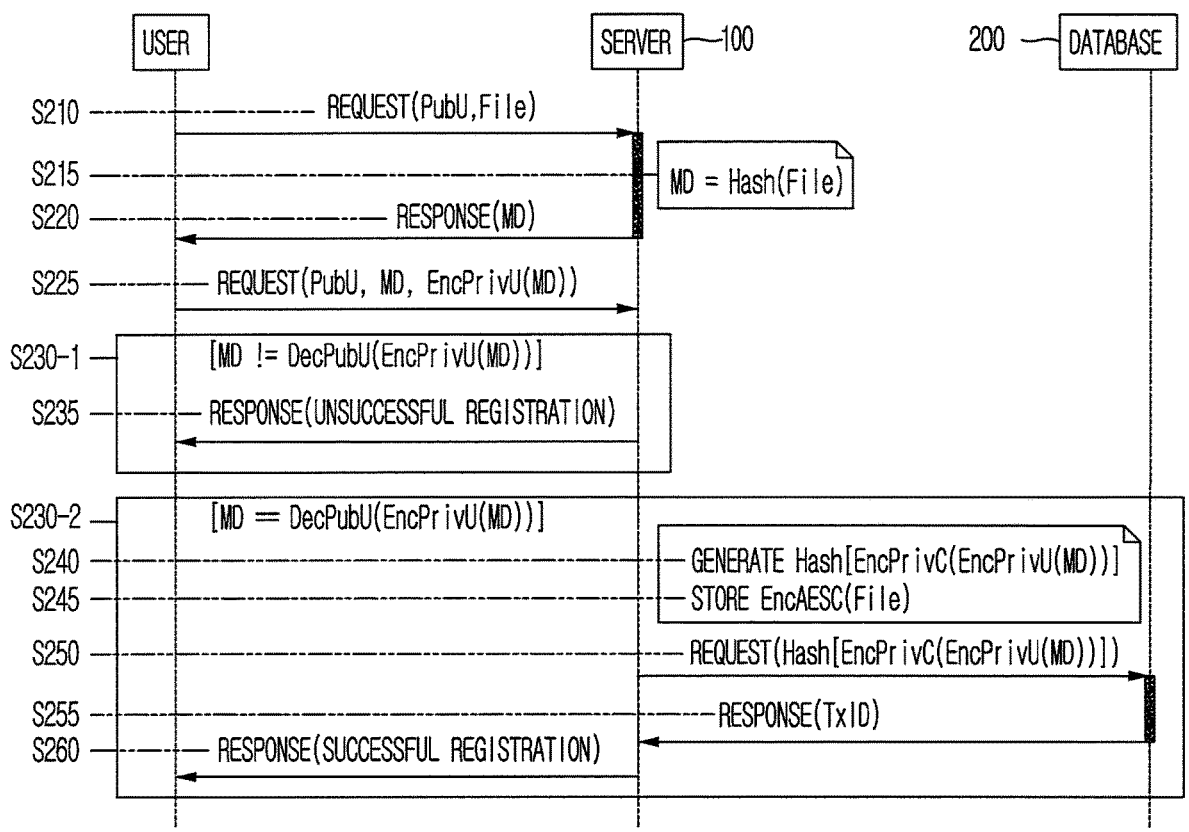
FIGS. 2 to 6 are sequence diagrams illustrating processes of performing the authentication of the file in accordance with various example embodiments of the present invention.

The communication part 110 may be configured to transmit and receive data to and from the user or a user device and a database 200. First, the communication part 110 may acquire an authentication request for the file at a step of S210. As illustrated in FIG. 2, if the authentication request for the file is acquired, the file and a public key PubU of the user who requested the authentication, may be acquired. The communication part 110 may respond to the request at a step of S220 where the request and its corresponding response may be performed during one TCP session.

If the authentication request for the file is acquired, the processor 120 may generate or support another device to generate a message digest of the file by using a hash function, i.e., MD=Hash(File), at a step of S215. Herein, the hash function may vary in its type. For example, the hash function may be triple sha256. Also, the hash function in the present specification generally means a function to transform the original file, but may include a function that just stores the file without any modification in an extreme case. In this case, the message digest generated by using the hash function may be the same as the file.

At the step of S220, the message digest MD generated in response to the authentication request may be transmitted to the user who requested the authentication of the file. If the user has requested the authentication of the file through the user device, not shown in the diagram, the generated MD may be transmitted to the user device.

Next, the communication part 110 may acquire EncPrivU (MD), generated by encoding the MD with a private key PrivU of the user, from the user at a step of S225. In this case, the MD and the PubU may also be received from the user because the TCP session may be disconnected after the response of the step S220. For reference, although the present specification is described by using expressions EncPriv(MD) and EncPub(MD) of encoding the MD with the private key and the public key, they may be replaced with SigPriv(File) and SigPub(File). Additionally, in case that the message digest is generated more than once, expressions SigPriv(MD) and SigPub(MD) may be used.

Further, if the EncPrivU(MD) generated by encoding the MD with the PrivU is acquired, and if the generated message digest B corresponds to information A which is DecPubU (EncPrivU(MD)) acquired by decoding the EncPrivU(MD) with the PubU at a step of S230-2, the processor 120 may generate or support another device to generate a hash value of a first encoded message digest generated by encoding the MD with the PrivU and a private key PrivC of the server 100 at a step of S240, and may register or support another device to register the generated hash value in the database 200 at a step of S250. The reason for registering the message digest in the form of a hash value in the database 200 is that the size of the data needs to be reduced due to the limits on a storage capacity of the database 200. Herein, the database 200 may be a blockchain of virtual currency. For example, it may be a bitcoin blockchain.

For reference, in FIG. 2, the expression 'DecPubU(EncPrivU(MD))==MD' is used to represent that the A corresponds to the B, but the expression of the present invention is not limited thereto. For example, 'True==VerPubU (SigPriv(File))' may also represent the same relationship. Additionally, in case that the message digest is generated more than once, the expression 'True==VerPubU(SigPriv (MD))' may be used.

Moreover, if the A corresponds to the B, the processor 120 may register or support another device to register Hash [EncPrivC(EncPrivU(MD))], which is the hash value of the first encoded message digest generated by encoding the MD in sequence with the PrivU and the PrivC, in the database 200. In other words, the hash value of the first encoded message digest may be registered in the database 200, after the user, who is a client, signs the MD first with the PrivU and then the server 100, which is an authentication officer, signs it with the PrivC. However, the order of signing may be different from this. Especially, if a session between the user and the server 100 is being maintained, the server 100 may sign the MD first and then the user may.

In case that the hash value of the first encoded message digest generated by encoding the MD with the PrivU and the PrivC is registered in the database 200, the communication part 110 may acquire a transaction ID, i.e., TxID, from the database 200 at a step of S255, wherein the transaction ID indicates a location of the hash value of the first encoded message digest registered in the database 200.

On the other hand, if the A does not correspond to the B at a step of S230-1, the processor 120 may send a message of an unsuccessful registration to the user by reason that the user is not a person related to the file, e.g. a transactor, at a step of S235.

Additionally, if the A corresponds to the B, the processor 120 may store or support another device to store the file at a step of S245. Herein, the file may be encrypted with a symmetric key encryption algorithm such as AES, i.e., Advanced Encryption Standard. In this case, the secret key may be a certain secret key processed from the public key of the user, but the scope of the present invention is not limited thereto.

The processor 120 may store or support another device to store the PubU, the MD, the EncPrivU(MD), and the TxID. Moreover, the processor 120 may further store or support another device to store EncPrivC(EncPrivU(MD)), which is the first encoded message digest generated by encoding the MD in sequence with the PrivU and the PrivC, and its hash value Hash[EncPrivC(EncPrivU(MD))].

If authentication information is registered in the database 200 as stated above, the communication part 110 may send a message of a successful registration to the user at a step of S260.

Figure 3:
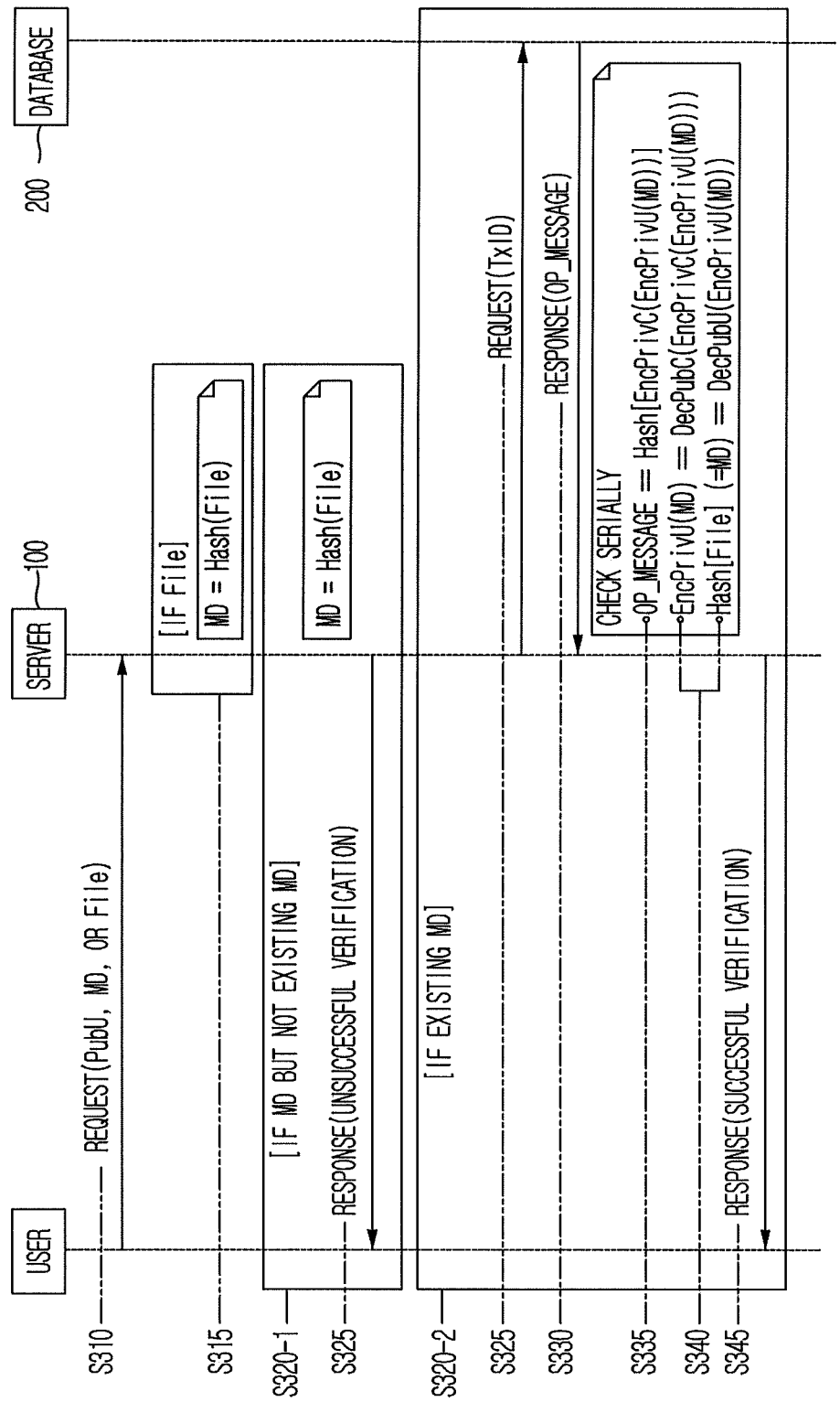

Next, a process for verifying a file in response to a request from a single user is explained by referring to FIG. 3.

The file may be verified by a separate device which may refer to information on the aforesaid server 100, or by the aforesaid server 100. Hereinafter, the explanation is based on the verification of the file by the aforesaid server 100 for convenience.

By referring to FIG. 3, similarly to the aforesaid example, the communication part 110 may acquire a verification request for the file at a step of S310. As illustrated in FIG. 3, if the verification request for the file is acquired, the file and the PubU, which is the public key of a user who requested the verification, may be acquired. The communication part 110 may respond to the request, and the request and its corresponding response may be performed within one TCP session.

As stated above, on condition that the server 100 has determined the user, who requested the authentication of the file, as related to the file in response to an authentication request for the file and, as a result, that the server 100 has stored the hash value of the first encoded message digest, generated by encoding the MD of the file with the PrivU and the PrivC, in the database 200, and has been managing its corresponding transaction ID, if the verification request for the file is acquired, the processor 120 may acquire or support another device to acquire the transaction ID corresponding to at least one of the PubU and the MD of the file. In this case, the transaction ID, i.e., TxID, may have been stored in the server 100 or in a device which the server 100 may refer to.

In case that the communication part 110 receives the verification request for the file at the step of S310, if the file is acquired for the verification, the processor 120 may generate or support another device to generate an original message digest of the file using the hash function, i.e., MD=Hash(File), at a step of S315. In this case, the processor 120 may refer to the transaction ID corresponding to at least one of the PubU and the generated original message digest of the file.

If no information corresponding to the original message digest is found, despite the verification request at a step of S320-1, the communication part 110 may send a message of an unsuccessful verification to the user at a step of S325.

Also, if the information, which is the transaction ID corresponding to the message digest, is found at a step of S320-2, the communication part 110 may send a query to the database 200 using the TxID at a step of S325 and acquire an OP message including the hash value of the first encoded message digest generated by encoding the MD with the PrivU and the PrivC from the database 200 at a step of S330.

Further, if a hash value of a second encoded message digest, generated by encoding the original message digest with the PrivC and the PrivU, corresponds to the hash value of the first encoded message digest, generated by encoding the MD with the PrivU and the PrivC, in the OP message, then the processor 120 may determine or support another device to determine the file as verified at a step of S335.

Herein, the second encoded message digest generated by encoding the original message digest with the PrivC and the PrivU may be EncPrivC(EncPrivU(MD)) which is generated by encoding the original message digest in sequence with the PrivU and the PrivC.

However, even in case that the hash value of X, which is the second encoded message digest generated by encoding the original message digest with the PrivC and the PrivU, corresponds to the hash value of the first encoded message digest, generated by encoding the MD with the PrivU and the PrivC, in the OP message, if a result value DecPubU (DecPubC(EncPrivC(EncPrivU(MD)))) acquired by decoding the X with a public key PubC of the server 100 and the PubU corresponds to the MD of the file, the processor 120 may further determine or support another device to determine the file as verified at a step of S340. In other words, the verification of the file may be completed with two more steps. This is because a possibility of changes in the private key, the public key, etc. of the user is considered.

The three steps of the verification above may be represented as the expressions below.

OP_MESSAGE=Hash[Enc$_{PrivC}$(Enc$_{PrivU}$(MD))]

Enc$_{PrivU}$(MD)=Dec$_{PubC}$[Enc$_{PrivC}$(Enc$_{PrivU}$(MD))]

MD(=Hash[File])=Dec$_{PubU}$[Enc$_{PrivU}$(MD)]    <Expressions 1>

If the verification of the file is successful, the communication part 110 may send a message of a successful verification to the user at a step of S345.

Also, if the file is determined as verified, the processor 120 may allow a download of the file. In this case, the user may download the file through the user device, etc.

Figure 4:
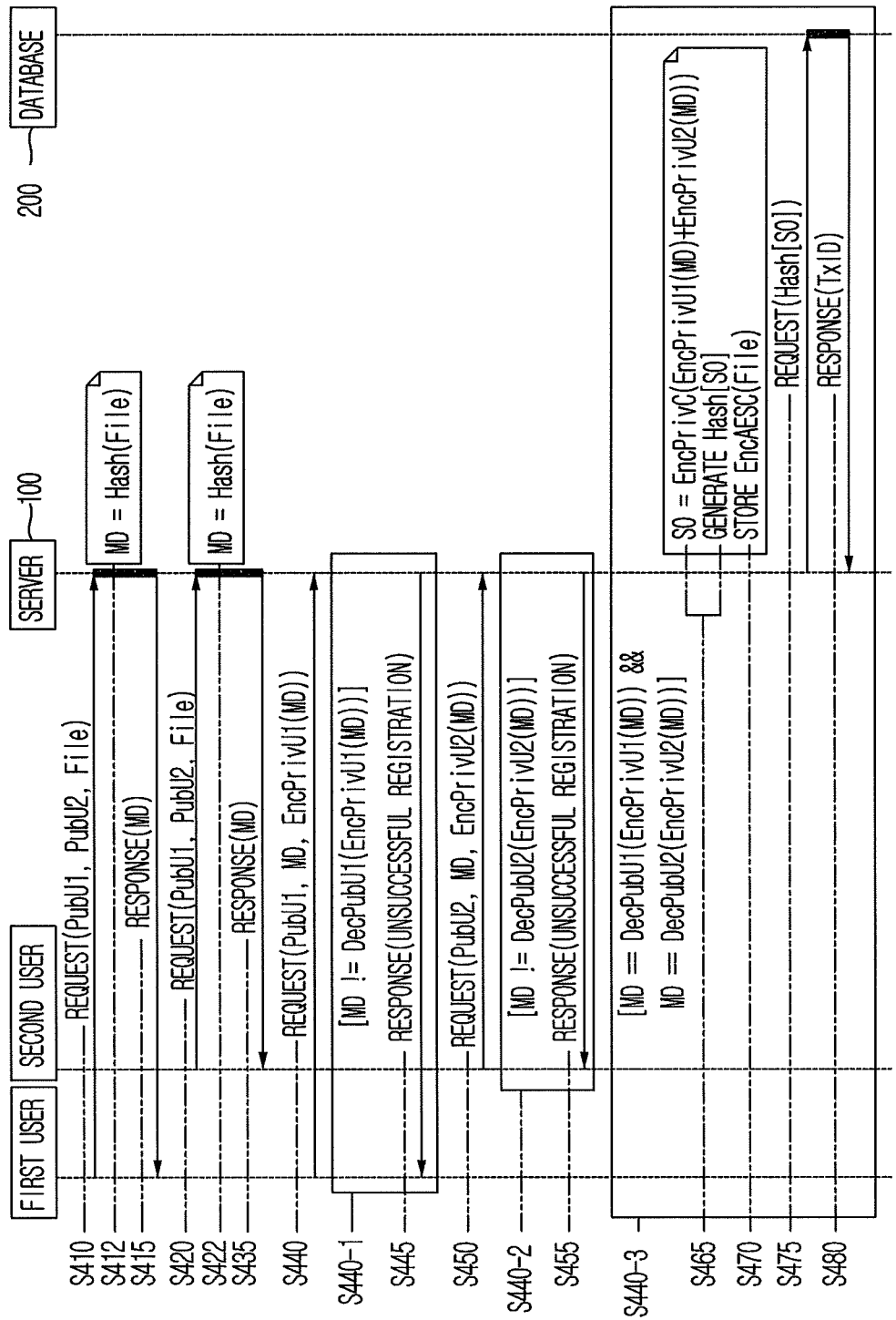
Figure 5:
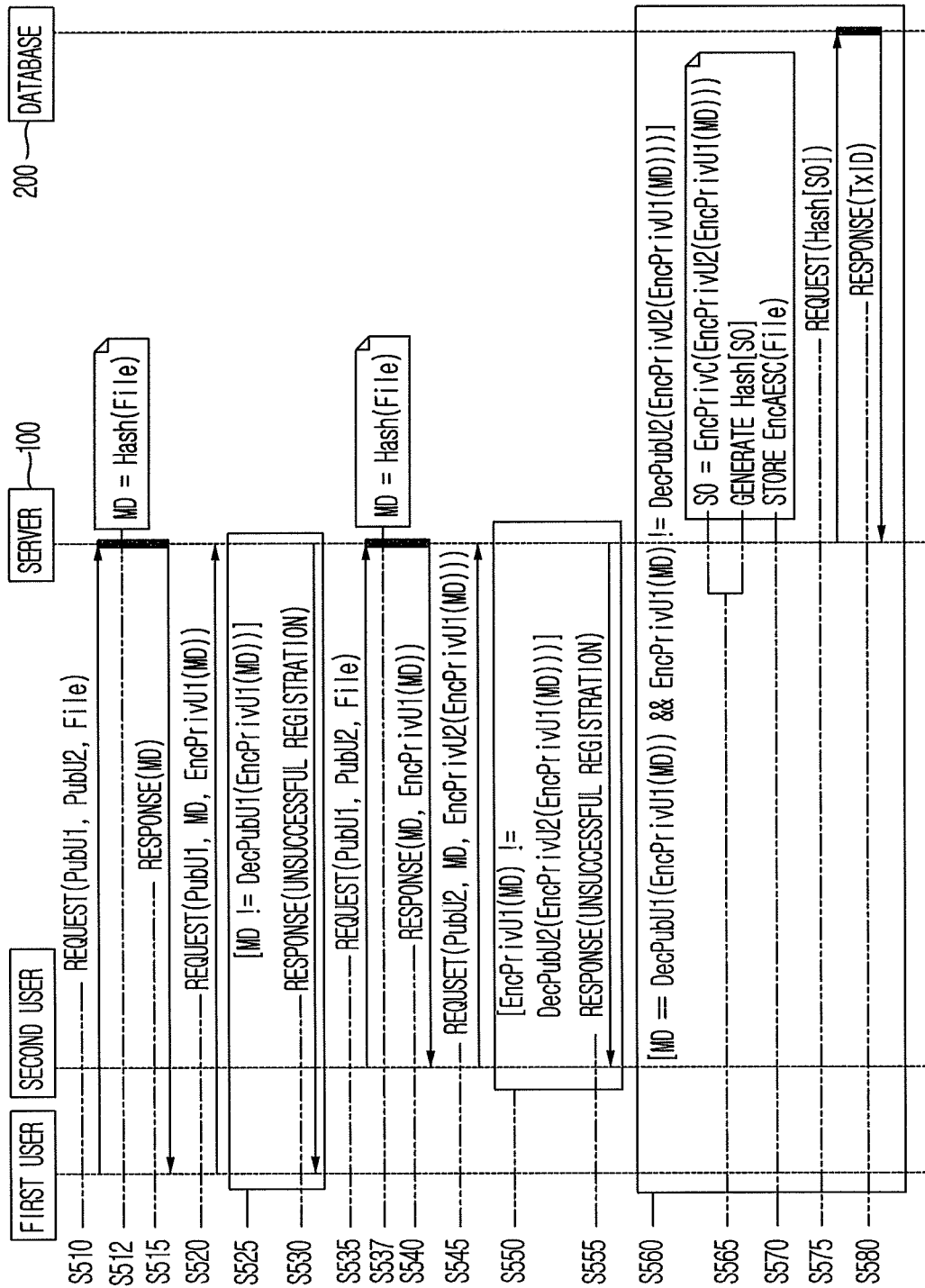

Next, a process for authenticating a file in response to requests from multiple users is explained by referring to the FIGS. 4 and 5. However, the repeated explanation is omitted.

FIG. 4 represents a process of parallel signing which performs the authentications in parallel, and FIG. 5 represents a process of serial signing which performs the authentications in sequence, in response to authentication requests from the multiple users.

First of all, by referring to FIG. 4, if the authentication request is acquired at each step of S410 and S420, the processor 120 may generate or support another device to generate the message digest of the file, i.e., MD=Hash(File), using the hash function at each step of S412 and S422. Moreover, if a first message digest generated by encoding the message digest with a private key PrivU1 of a first user and a second message digest generated by encoding the message digest with a private key PrivU2 of a second user are acquired at steps of S440 and S450, and if each piece of (i) information A' which is DecPubU1(EncPrivU1(MD)) acquired by decoding the first message digest with a public key PubU1 of the first user and (ii) information B' which is DecPubU2(EncPrivU2(MD)) acquired by decoding the second message digest with a public key PubU2 of the second user corresponds to the generated message digest C', which is the MD, at a step of S440-3, then the processor 120 may register or support another device to register a hash value of a third message digest, generated by encoding the MD with the PrivU1, the PrivU2, and the PrivC, in the database 200 at a step of S475.

Next, the communication part 110 may acquire a transaction ID indicating a location of the registered hash value of the third message digest in the database 200 at a step of S480.

Moreover, if each of the A' and the B' corresponds to the C', the processor 120 may register or support another device to register EncPrivC(EncPrivU1(MD)+EncPrivU2(MD)), which is acquired by encoding a sum value with the PrivC, in the database 200, wherein the sum value is a sum of the first message digest generated by encoding the MD with the PrivU1 and the second message digest generated by encoding the MD with the PrivU2.

Next, by referring to FIG. 5, if the authentication request for the file is acquired at each step of S510 and S535, the processor 120 may generate or support another device to generate the message digest of the file using the hash function, i.e., MD=Hash(File), at each step of S512 and S537. In this case, as illustrated in FIG. 5, the PubU1, the PubU2, and the file may be acquired together.

If (i) the first message digest EncPrivU1(MD), generated by encoding the message digest with the PrivU1, is acquired at a step of S520, and information A" which is the DecPubU1(EncPrivU1(MD)) acquired by decoding the first message digest with the PubU1 corresponds to the generated message digest B", which is the MD, and if (ii) EncPrivU2 (EncPrivU1(MD)), generated by encoding the message digest with the PrivU1 and the PrivU2, is acquired at a step of S545, and information C" which is DecPubU2(EncPrivU2(EncPrivU1(MD))) acquired by decoding the EncPrivU2(EncPrivU1(MD)) with the PubU2 corresponds to information D" which is the first message digest EncPrivU1(MD) at a step of S560, then the processor 120 may register or support another device to register the hash value of the third message digest, generated by encoding the message digest with the PrivU1, the PrivU2, and the PrivC, in the database 200 at a step of S575.

Moreover, if the A" corresponds to the B", and if the C" corresponds to the D", the processor 120 may register or support another device to register SO=EncPrivC(EncPrivU2 (EncPrivU1(MD))), which is generated by encoding the message digest in sequence with the PrivU1, the PrivU2, and the PrivC, in the database 200.

Herein, the communication part 110 may acquire the transaction ID, i.e., TxID, indicating a location of the registered hash value of the third message digest in the database 200 at a step of S580.

Figure 6:
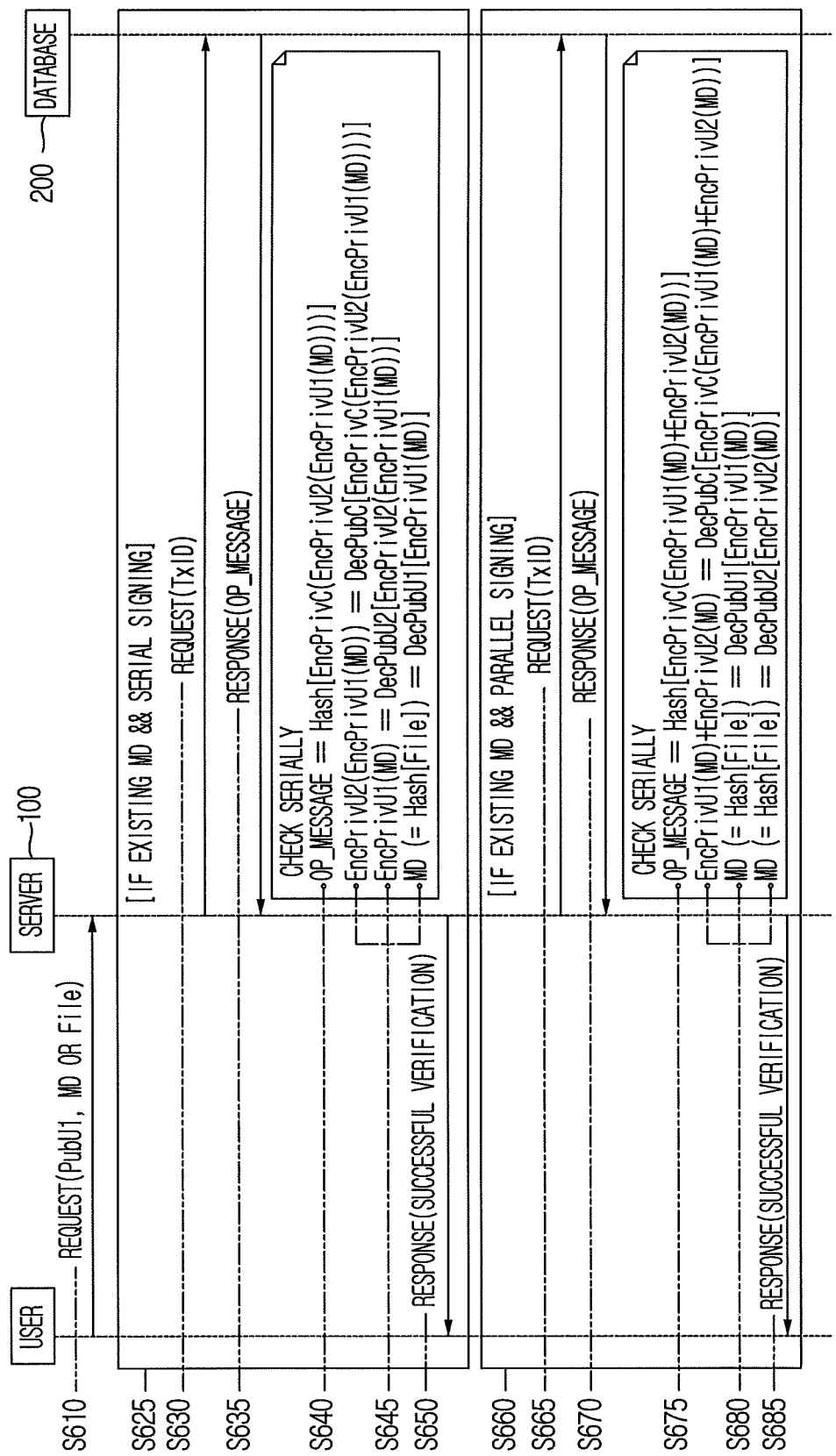

Next, a process for verifying the file in response to requests from multiple users is explained by referring to FIG. 6. However, the repeated explanation is omitted. For reference, steps from S625 to S650 represent a serial signing process for verifying the file in sequence, and steps from S660 to S685 represent a parallel signing process for verifying the file in parallel, in response to verification requests from at least part of the multiple users. These processes may be performed at different times, or at the same time.

By referring to FIG. 6, as stated above, on condition that the server 100 has determined the first user and the second user as related to the file in response to the authentication requests for the file, and that the server 100, as a result, has stored the hash value of the third message digest, generated by encoding the MD of the file with the PrivU1, the PrivU2, and the PrivC, in the database 200, and that the server 100 has been managing its corresponding transaction ID, i.e., TxID, if at least one of the verification requests for the file is acquired at a step of S610, the processor 120 may acquire the TxID corresponding to at least one of a specific message digest of the file, i.e., MD=Hash(File), and the public keys of the users who request the verification of the file.

Also, the communication part 110 may acquire an OP message, which includes the hash value of the third message digest generated by encoding the message digest with the PrivU1, the PrivU2, and the PrivC, from the database 200 using the TxID at each step of S635 and S670.

Further, if a hash value of a fourth message digest generated by encoding the specific message digest with the PrivC, the PrivU1, and the PrivU2 correspond to the hash value of the third message digest, generated by encoding the MD with the PrivU1, the PrivU2, and the PrivC, in the OP message, then the processor 120 may determine or support another device to determine the file as verified at each step of S640 and S675.

In case of the parallel signing process, the processor 120 may determine or support another device to determine the file as verified according to whether Hash[EncPrivC(EncPrivU1(MD)+EncPrivU2(MD))], which is a hash value of a first encoded value acquired by encoding a sum value with the PrivC, corresponds to the hash value of the third message digest, generated by encoding the MD with the PrivU1, the PrivU2, and the PrivC, in the OP message, wherein the sum value is a sum of a fifth message digest generated by encoding the specific message digest with the PrivU1 and a sixth message digest generated by encoding the specific message digest with the PrivU2.

However, even in case that the hash value Hash[EncPrivC(EncPrivU1(MD)+EncPrivU2(MD))] of Y, which is the first encoded value acquired by encoding the sum value with the PrivC, corresponds to the hash value of the third message digest, generated by encoding the message digest with the PrivU1, the PrivU2, and the PrivC, in the OP message, if (i) a first decoded value obtained by decoding the fifth message digest, which is obtained by decoding the Y with the PubC, with the PubU1 corresponds to the MD, and if (ii) a second decoded value obtained by decoding the sixth message digest, which is obtained by decoding the Y with the PubC, with the PubU2 corresponds to the MD, the processor 120 may determine or support another device to determine the file as verified. In other words, the verification of the file may be completed with three more steps.

The four steps of the verification above may be represented as the expressions below.

$$OP\_MESSAGE == Hash[Enc_{PrivC}(Enc_{PrivU1}(MD) + Enc_{PrivU2}(MD))]$$

$$Enc_{PrivU1}(MD) + Enc_{PrivU2}(MD) == Dec_{PubC}[Enc_{PrivC}(Enc_{PrivU1}(MD) + Enc_{PrivU2}(MD))]$$

$$MD(=Hash[File]) == Dec_{PubU1}[Enc_{PrivU1}(MD)]$$

$$MD(=Hash[File]) == Dec_{PubU1}[Enc_{PrivU1}(MD)] \quad <\text{Expressions 2}>$$

On the other hand, in case of the serial signing process, the processor 120 may determine or support another device to determine the file as verified according to whether Hash[EncPrivC(EncPrivU2(EncPrivU1(MD)))], which is the hash value of a second encoded value acquired by encoding the specific message digest in sequence with the PrivU1, the PrivU2, and the PrivC, corresponds to the hash value of the third message digest, generated by encoding the message digest with the PrivU1, the PrivU2 and the PrivC, in the OP message.

However, even in case that the hash value Hash[EncPrivC(EncPrivU2(EncPrivU1(MD)))] of Z, which is the second encoded value acquired by encoding the specific message digest in sequence with the PrivU1, the PrivU2, and the PrivC, corresponds to the hash value of the third message digest, generated by encoding the message digest with the PrivU1, the PrivU2, and the PrivC, in the OP message, if DecPubU1 (DecPubU2(DecPubC(EncPrivC(EncPrivU2 (EncPrivU1(MD)))))) obtained by decoding the Z in sequence with the PubC, the PubU2, and the PubU1 corresponds to the MD, the processor 120 may determine or support another device to determine the file as verified. In other words, the verification of the file may be completed with three more steps.

The four steps of the verification above may be represented as the expressions below.

$$OP\_MESSAGE == Hash[Enc_{PrivC}(Enc_{PrivU2}(Enc_{PrivU1}(MD)))]$$

$$Enc_{PrivU2}(Enc_{PrivU1}(MD)) == Dec_{PubC}[Enc_{PrivC}(Enc_{PrivU2}(Enc_{PrivU1}(MD)))]$$

$$Enc_{PrivU1}(MD) == Dec_{PubU2}[Enc_{PrivU2}(Enc_{PrivU1}(MD))]$$

$$MD(=Hash[File]) == Dec_{PubU1}[Enc_{PrivU1}(MD)] \quad <\text{Expressions 3}>$$

The present invention has an effect of providing an authentication system for the file to perform the authentication and the verification in real-time without a possibility of forgery and falsification and without constraints of space by recording the authentication information in the blockchain of the virtual currency.

The present invention has another effect of providing the authentication system for the file with guaranteed security to perform the authentication and the verification in real-time without the possibility of forgery and falsification and without the constraints of space by using the hash function and an encryption technology.

Meanwhile, the processor 120 may control a data flow among the communication part 110 and the other components. That is, the processor 120 may control the communication part 110 and other components to perform their unique functions, by controlling the data flow among each component within the server 100.

The processor 120 may include hardware configuration of MPU (Micro Processing Unit) or CPU (Central Processing Unit), cache memory, data bus, etc. Additionally, OS and software configuration of applications that achieve specific purposes may be further included.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a compiler but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for authenticating a file by using a system including (i) at least one user device of a user who requests an authentication of the file, (ii) a server performing the authentication of the file in response to an authentication request from the user, and (iii) a blockchain device, linked with the server, managing a blockchain of virtual currency, comprising steps of:
   (a) the server, when the authentication request for the file is acquired, generating or supporting another device to generate a specific message digest of the file using a hash function and transmitting or supporting another device to transmit the specific message digest to the user device;
   (b) the server acquiring or supporting another device to acquire a first message digest generated by encoding the specific message digest with a private key of a user from the user device and registering or supporting another device to register a hash value of a second message digest in the blockchain of the virtual currency by using the blockchain device, wherein the second message digest is generated by encoding the first message digest with a private key of the server; and
   (c) the server acquiring or supporting another device to acquire a transaction ID indicating a location of the hash value registered in the blockchain of the virtual currency by using the blockchain device;
   wherein the server stores or supports another device to store the public key of the user, the specific message digest, the first message digest, the transaction ID, the second message digest generated by encoding the specific message digest in sequence with the private key of the user and the private key of the server, and the hash value of the second message digest generated by encoding the specific message digest in sequence with the private key of the user and the private key of the server.

2. The method of claim 1, wherein, at the step of (b), the server acquires or supports another device to acquire the first message digest, a public key of the user, and the specific message digest from the user device; and registers or supports another device to register the hash value of the second message digest in the blockchain of the virtual currency by using the blockchain device, when reference information acquired by decoding the first message digest with the public key of the user corresponds to the specific message digest.

3. The method of claim 2, wherein, when the reference information corresponds to the specific message digest, the server stores or supports another device to store the file.

4. The method of claim 2, wherein, when the reference information does not correspond to the specific message digest, the server informs or supports another device to inform that the user is not related to the file.

5. A server for authenticating a file within a system including (i) at least one user device of a user who requests an authentication of the file, (ii) the server performing the authentication of the file in responds to an authentication request from the user, and (iii) a blockchain device, linked with the server, managing a blockchain of virtual currency, the server comprising:
   a communication part for acquiring or supporting another device to acquire the authentication request for the file; and
   a processor for performing processes of, (I) when the authentication request for the file is acquired, generating or supporting another device to generate a specific message digest of the file using a hash function, (II) transmitting or supporting another device to transmit the specific message digest to the user device, (III) acquiring or supporting another device to acquire a first message digest generated by encoding the specific message digest with a private key of a user from the user device, (IV) registering or supporting another device to register a hash value of a second message digest in the blockchain of the virtual currency by using the blockchain device, wherein the second message digest is generated by encoding the first message digest with a private key of the server, and (V) acquiring or supporting another device to acquire a transaction ID indicating a location of the hash value registered in the blockchain of the virtual currency bu using the blockchain device;
   wherein the processor stores or supports another device to store the public key of the user, the specific message digest, the first message digest, the transaction ID, the second message digest generated by encoding the specific message digest in sequence with the private key of the user and the private key of the server, and the hash value of the second message digest generated by encoding the specific message digest in sequence with the private key of the user and the private key of the server.

6. The server of claim 5, wherein, at the processes of (III) and (IV), the server acquires or supports another device to acquire the first message digest, a public key of the user, and the specific message digest from the user device; and registers or supports another device to register the hash value of the second message digest in the blockchain of the virtual currency by using the blockchain device, when reference information acquired by decoding the first message digest with the public key of the user corresponds to the specific message digest.

7. The server of claim 6, wherein, the processor, when the reference information corresponds to the specific message digest, stores or supports another device to store the file.

8. The server of claim 6, wherein, the processor, when the reference information does not correspond to the specific message digest, informs or supports another device to inform that the user is not related to the file.

* * * * *